Nov. 14, 1933.　　　G. W. KUENNETH　　　1,934,720
FRICTION BRAKE
Filed March 14, 1930　　　3 Sheets-Sheet 1
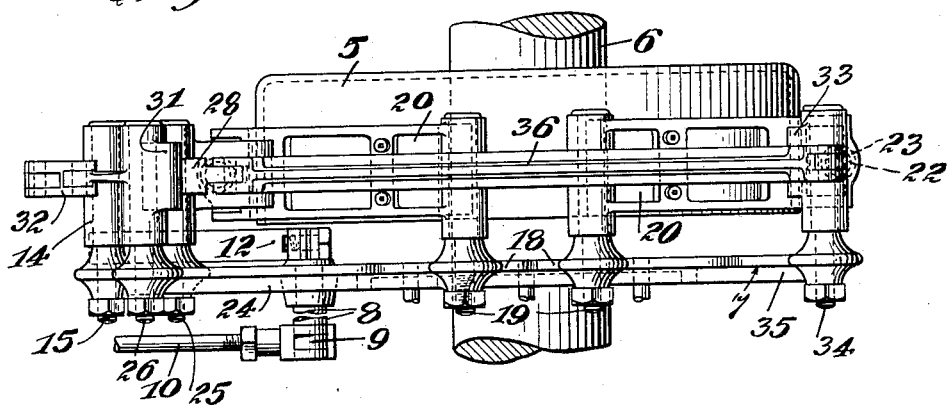
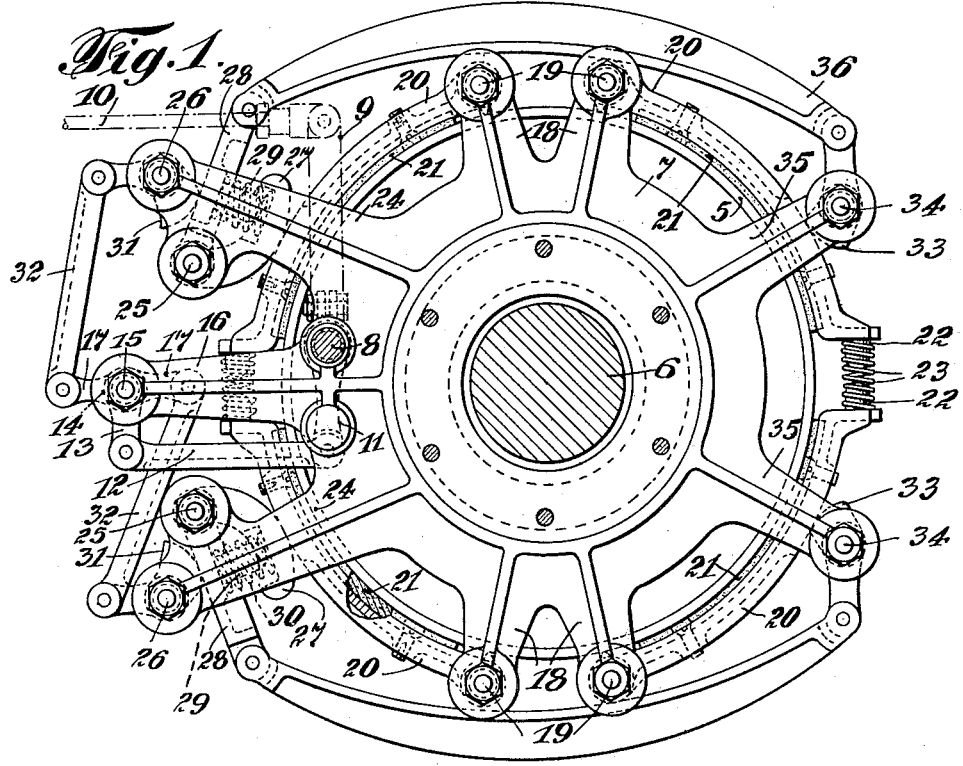
INVENTOR
George W. Kuenneth
BY
his ATTORNEY

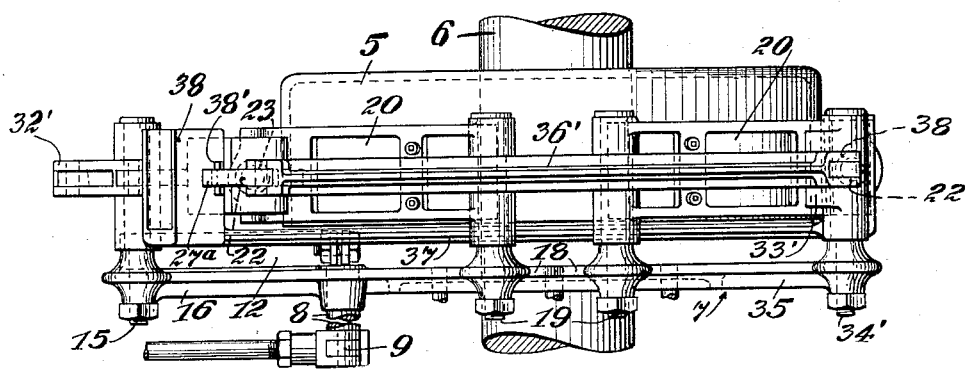

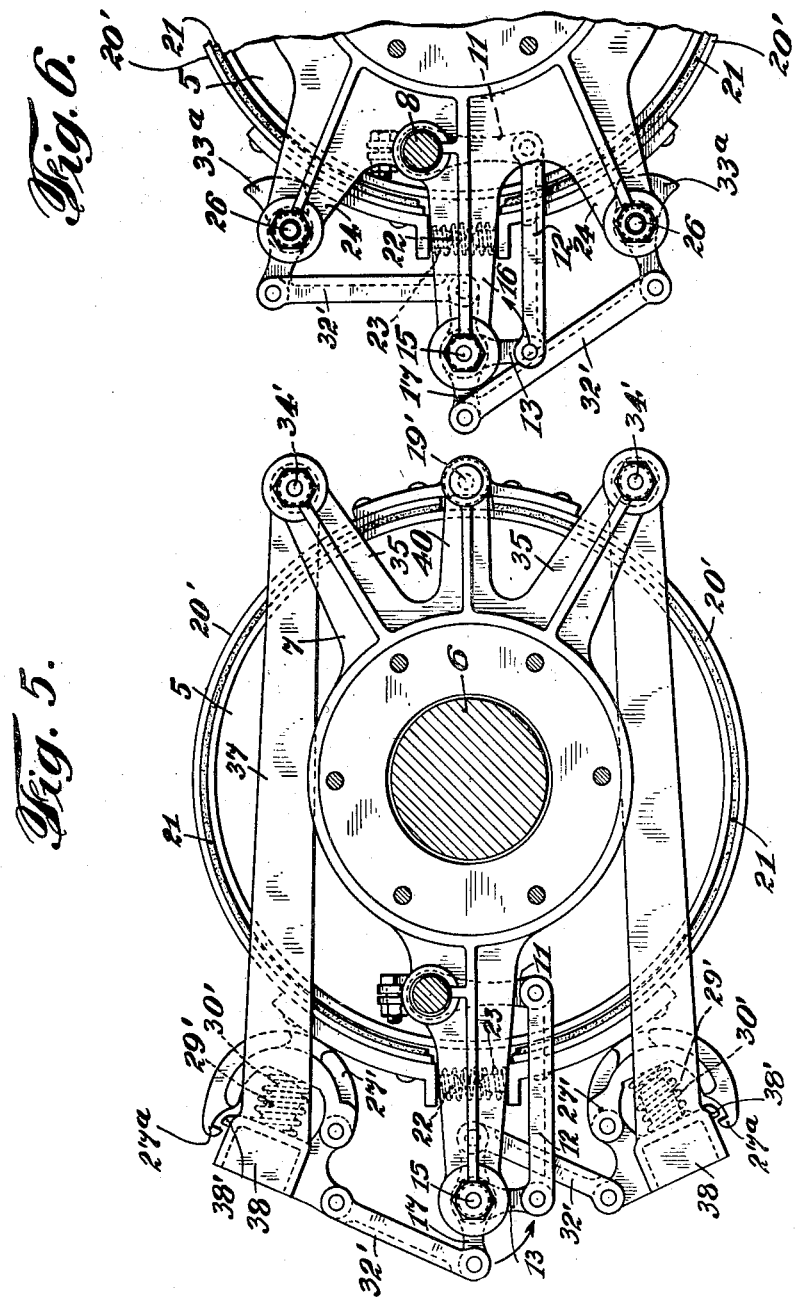

Patented Nov. 14, 1933

1,934,720

UNITED STATES PATENT OFFICE 1,934,720

FRICTION BRAKE

George W. Kuenneth, Brooklyn, N. Y., assignor to Jeannette Kuenneth, Brooklyn, N. Y.; Margaret H. Kuenneth, administratrix of said Jeannette Kuenneth, deceased Application March 14, 1930. Serial No. 435,700

7 Claims. (Cl. 188—75)

This invention relates to friction brakes, and has for its primary object to provide a simple, efficient and reliable brake of this type for the purpose of quickly retarding and bringing to a full stop a revolving brake drum and parts connected therewith without appreciable shock or jar to the machine parts.

It is another object of my invention to provide a friction type brake wherein the several elements are very compactly associated and arranged and which is applicable to various machines, including the wheels of motor vehicles and in which the application of the braking force is substantially uniformly distributed upon the surface of the brake drum. To this end, the fundamental feature of my present improvements is primarily characterized by the fact that initially the braking force is yieldingly applied to the surface of the brake drum, thereby reducing its velocity and thereafter a non-yielding braking force is automatically applied to the surface of the brake drum to positively lock said drum and the connected parts against further rotation.

In one embodiment of the invention, I provide two or more brake shoes pivotally mounted at one of their ends and normally yieldingly held in expanding relation out of braking engagement with the drum surface, and each of said brake shoes being provided on its inner face with a suitable friction lining. Cam means is mounted and arranged to coact with the respective brake shoes, said cam means being successively actuated by a suitable system of lever and link connections whereby the application of the braking force will at all times be substantially the same regardless of wear upon the friction linings, thus insuring reliable action and the complete stoppage or breakage of the drum and connected parts within a predetermined time period regardless of speed or load conditions.

With the above and other objects in view, the invention consists in the improved friction brake, and in the form, construction and relative arrangement of its several parts as will be hereinafter more fully described, illustrated in the accompanying drawings, and subsequently incorporated in the subjoined claims.

In the drawings, wherein I have illustrated several simple and practical embodiments of my present improvements, and in which similar reference characters designate corresponding parts throughout the several views,—

Figure 1 is a side elevation showing one practical form of my improved friction brake;

Fig. 2 is a top plan view thereof;

Fig. 3 is a view similar to Fig. 1 illustrating an alternative embodiment of the invention;

Fig. 4 is a top plan view thereof;

Fig. 5 is a side elevation showing still another modified construction, and

Fig. 6 is a fragmentary elevation of another modification.

Referring now more particularly to Figs. 1 and 2 of the drawings, the brake drum indicated at 5 may be of any preferred construction and suitably fixed upon a driving or driven shaft 6. At one side of the brake drum, the multi-armed spider or frame 7 is suitably mounted or secured upon a fixed part of the machine frame. At one side of the shaft 6 and in parallel relation therewith, a rock shaft 8 is journalled in the frame 7. At one side of the frame an arm 9 is fixed to one end of said shaft and has its other end connected by the rod 10 with an operator's lever (not shown). A second arm 11 is fixed to the other end of the rock shaft 8 and connected by a link 12 to an arm 13 on one end of the sleeve 14 loosely engaged on the bolt 15 fixed in a radially projecting arm 16 of the frame 7. This sleeve is also provided intermediate of its ends with oppositely projecting arms 17 for the purpose of transmitting movement to the brake shoe operating mechanism in a manner to be presently described.

The frame 7 is also formed at diametrically opposite points with the pairs of radial arms 18 in each of which a bolt 19 is suitably fixed. On these bolts the brake shoes 20 are pivotally supported at one of their ends, said brake shoes extending in relatively opposite directions from the spaced bolts 19 around the annular wall of the brake drum. Each of these brake shoes is provided upon its inner face with a liner 21 of fiber, metal or other suitable material of high frictional resistance. Each pair of brake shoes located respectively at opposite sides of the drum center terminate at their free ends in outwardly projecting lugs which are provided with the opposing pins 22 around which opposite ends of the expansion coil springs 23 are engaged. These springs normally act to expand the brake shoes in each pair and yieldingly hold the friction liner 21 thereof out of engagement with the surface of the brake drum.

The spider or frame 7 at opposite sides of the arm 16 is formed with the additional outwardly projecting arms 24 and in the outer ends of these arms spaced bolts 25 and 26 respectively, extending in parallel relation to the drum wall are fixed. On each of the bolts 25 an arcuately curved cam lever 27 is pivotally mounted at one of its ends. One end of a link 28 is also independently pivotally connected with each of the bolts 25. Each of said links carries a pin 29 and a coil spring 30 surrounds said pin and is interposed between the free end of the cam lever 27 and said link. At the opposite side of the link 28, a cam 31 is mounted on each of the bolts 26 and is connected by a link 32 with one of the arms 17.

The cam levers 27 above referred to respectively coact with one pair of the brake shoes at one side of the drum 5 while the brake shoes at the opposite side of said drum are actuated by the cam members 33 pivotally mounted on bolts 34 fixed in the radial arms 35 of the frame 7. Each of these cam members 33 is connected by a bar 36 with one of the links 28.

In the operation of the above described embodiment of the invention, in the first or initial portion of the movement of the operator's lever, action is transmitted through the rock shaft 8 and the link connections 12 and 32 between this rock shaft and the cam members 31 whereby said cam members are caused to act upon the links 28 and thereby compress the springs 30 to yieldingly transmit such movement of the links to the cam levers 27, these levers in turn acting against the brake shoes on one side of the drum to yieldingly urge the friction liners of said brake shoes against the outer surface of the drum wall, thus applying a braking or retarding force to the continued rotation of the drum, the shaft 6 or other parts connected with said drum. Likewise, through the links 28 and bars 36 and cam members 33, the brake shoes at the opposite side of the drum are positively urged to frictional engagement with the wall thereof. This position of the parts is substantially that shown in Fig. 1 of the drawings. Upon a further rocking motion of the shaft 8, motion is transmitted through the links 28 and bars 36 to the cam members 33 to further actuate said cam members and engage the high portions thereof with the respective brake shoes, at which time the pins 29 are caused to contact with and bear upon the free ends of the cam levers 27. Thus, all four of the brake shoes are positively and non-yieldingly urged against the wall of the brake drum with gradually increasing pressure to apply the maximum of frictional resistance to the rotation of the drum, thus quickly bringing the drum and the shaft or other parts to a complete stop and locking the same against further rotation.

It will be seen that there is thus initially applied to the periphery of the brake drum a yielding braking force which arrests or retards the momentum of the brake shaft and connected parts without subjecting the same to sudden shock or jar, and thereafter when the momentum has appreciably decreased, the positive braking pressure is applied to securely lock and hold the drum against rotation. By the division of the braking force thus simultaneously applied through a plurality of brake shoes at diametrically opposite points upon the surface of the drum wall, a non-impulsive and uniform application of the braking force is secured. Upon the reverse movement of the operator's lever, the several brake shoes are immediately returned to their normal or released positions by the springs 23. Any wear upon the brake liners 21 is fully taken up and compensated for by the springs 30 so that the extent of rocking movement of the cam elements to fully apply the braking force will be automatically increased as conditions require.

In Figs. 3 and 4 of the drawings, I have illustrated an alternative form of the operating means for the several brake shoes. The arrangement of these brake shoes is substantially the same as that above referred to, but instead of mounting the cam levers 27 upon arms at one side of the supporting frame or spider, I pivotally connect the substantially semi-circular cam levers 27' with the heads 38 formed on one end of the bars 37, said heads carrying pins or studs 29' for the springs 30' which are interposed between said heads and the levers 27'. The heads 38 are connected by link members 32' with the motion transmitting rock shaft in the same manner as above explained. The other ends of the levers 37 are pivotally supported upon the bolts 34' at the opposite side of the brake drum and cam members 33' are also loosely mounted on said bolts for independent rocking movement. These cam members are connected by bars 36' to the other ends of the cam levers 27'.

In the operation of this last described form of the invention, in the initial rocking movement of the shaft 8, the ends of the bars 37 having the heads 38 thereon are drawn towards each other and a circumferential sliding movement of the cam levers 27' upon the respective brake shoes takes place together with an inward movement of the bars 36' towards the drum wall, thus applying a yielding braking pressure through the springs 30' and the cams 27' and 33' upon the several brake shoes which is transmitted to the wall of the drum. Upon further rotation of the shaft 8, a lug 38' on the head 38 engages a lip 27ª on one end of the cam levers 27', thereby preventing independent pivotal movement of said head and the lever 27' with respect to the bar 36' and causing a positive longitudinal pull upon the bar 36' while at the same time there is a sliding rocking movement of the cam levers 27' against the brake shoes at one side of the drum. Thus, these cam levers and the cam members 33' act upon the several brake shoes to cause the same to exert an additional frictional braking pressure against the wall of the drum so that said drum will be positively and securely locked or held against rotation.

In Fig. 5 of the drawings, I have shown another form of the invention wherein the brake band consists of two semi-circular sections or shoes 20' which are pivotally mounted at one of their ends as at 19' upon the arm 40 of the fixed frame or spider. The opposite ends of the brake shoes or sections are yieldingly urged apart to hold the friction linings thereof out of contact with the braking surface of the drum by a suitable spring arranged therebetween in the same manner as previously described. In this construction only one pair of cam levers coacting with the respective brake band sections adjacent their latter ends are employed, said cam levers being of the same form and arrangement and operated by a similar link mechanism from the main rock shaft to that shown at the left hand side of Fig. 3 of the drawings. Therefore, in this construction it will be understood that in the first movement of the rock shaft, a yielding pressure is applied adjacent the free ends of the brake band sections which are rocked upon the pivot 19' and gradually urged with increasing pressure against the wall of the brake drum and thereafter, a positive non-yielding pressure is transmitted through the cam levers to said brake band sections to finally lock the brake drum against rotation.

As shown in Fig. 6 of the drawings, in lieu of the brake levers initially yielding with respect to the brake band sections, I may provide the cam members 33ᵃ similar to the members 33 and 33' and actuated by the link mechanism from the rock shaft to apply a positive non-yielding pressure at all times against the free ends of the pivoted brake band sections.

In each of the constructions above described, it will be understood that a brake drum may be provided at each end of the shaft 6 and the rock shaft 8 operatively connected at its respective ends to the cam actuating link and lever connections for simultaneously applying the braking pressure to the walls of said drums. I have herein shown and described a manner of arrangement of the several cooperating elements for the application of an external braking force upon the drum wall, but it will be understood that by resorting to obvious re-arrangements of the several parts, such mechanism might also be adapted for operation as an internal brake to apply the braking pressure against the inner surface of the drum wall.

From the foregoing description considered in connection with the accompanying drawings, it is believed that the several essential features of my present improvements will be readily understood. It will be seen that I have devised a novel form of friction brake which also acts in the nature of a shock absorber and first applies an initial yielding braking pressure and after the momentum of the brake drum and the parts connected therewith has been appreciably checked or decreased, a final positive and non-yielding additional pressure is applied, thereby increasing the braking force and quickly bringing the parts to a full stop. Thus, the transmission of violent shock or vibration to the body of a vehicle or other machine in connection with which the brake is used will be obviated although the brake may be very suddenly or quickly applied. While the improved brake is particularly advantageous for use upon motor vehicles, it may also be satisfactorily employed in connection with various other machines where a quickly effective braking means of this character may be found desirable.

While I have herein shown and described several practical and satisfactory embodiments of my present improvements, it will nevertheless be understood that the several essential features thereof may also be incorporated in various other alternative construction, and I accordingly reserve the privilege of resorting to all such legitimate changes in the form, proportion and relative arrangement of the several parts as may be fairly incorporated in the spirit and scope of the invention as claimed.

I claim:

1. In a friction brake, a brake drum, brake shoes pivotally mounted at one of their ends, pivoted cam members slidably mounted to move along the surface of said shoes and coacting with the respective brake shoes adjacent their other ends for slidably compressing the brake shoes against the brake drum, and rocking means to first yieldingly urge one of said cam members against one of the brake shoes to cause a yielding frictional pressure of said shoe on the wall of the brake drum, and thereafter simultaneously cause a further, positive, non-yielding movement of both cam members to apply further non-yielding braking pressure of the brake shoes upon the drum wall.

2. In a friction brake, a brake drum, a plurality of brake shoes pivotally arranged in pairs at opposite sides of the drum center, actuating members slidably movable on said shoes cooperating with the respective brake shoes for slidably compressing the same against the brake drum, and means in connection with the actuating members for operating said actuating members to first yieldingly urge one pair of brake shoes against the drum wall and thereafter positively and non-yieldingly urge both pairs of brake shoes into frictional engagement with the wall of the drum to lock the same against rotation.

3. In a friction brake, a brake drum, a relatively fixed frame on said drum, two pairs of brake shoes arranged respectively on opposite sides of the drum center and pivotally mounted at one of their ends on said frame to cooperate with the drum wall, cam members pivoted on said frame to coact with the respective brake shoes, pivotally mounted levers opposed to the cam members engaging one pair of brake shoes, coil springs arranged between said levers and the respective cam members, means operatively connecting said levers with the cam members engaging the other pair of brake shoes, a rock shaft, and means for transmitting movement from said rock shaft to said levers to thereby initially urge one pair of brake shoes yieldingly against the drum wall and thereafter simultaneously apply a positive, non-yielding braking movement to all of said shoes to lock the brake drum against rotation.

4. In a friction brake, a brake drum, a relatively fixed frame, two pairs of brake shoes arranged respectively on opposite sides of the brake center and pivotally mounted at one of their ends on said frame to cooperate with the drum wall, members pivoted on said frame to coact with respective brake shoes, pivotally mounted and slidable arc shaped levers opposed to the members engaging one pair of brake shoes and in tangential relation therewith, springs arranged between said slidable levers and the respective members, means operatively connecting said levers with the members engaging the other pair of brake shoes, a rock shaft, and means for transmitting movement from said rock shaft to said lever to thereby initially urge one pair of brake shoes yieldingly against the drum wall and thereafter simultaneously apply a positive non-yielding braking movement to all of said shoes to lock the brake drum against rotation.

5. Brake mechanism comprising a drum, a plurality of substantially rigid shoes located about the drum, each shoe being pivotally mounted at one end, arc shaped cams cooperating with the respective shoes relatively near their free ends and adapted to slide along said shoes in tangential relation therewith, yielding means for actuating certain of the cams and positive means actuating other of the cams, so that certain of the shoes are applied to the drum with yielding pressure and other shoes are applied with positive pressure.

6. A brake mechanism comprising a brake drum, a relatively fixed frame in connection with the drum, brake shoes pivotally mounted on one of their ends upon said frame in cooperative relation with the drum wall and resiliently movable at the other end against the drum, a cam lever slidably movable on and coacting with each shoe adjacent its other end and adapted to cause relative sliding compression on the shoe as it is moved against the brake, a rock shaft, and means in connection with said cam levers for initially transmitting a yielding rocking movement to both cam levers from said rock shaft and thereafter transmitting a further positive non-yielding pressure through said cam levers upon the brake shoes to cause a further frictional braking action upon the drum wall and thereby lock said drum against rotation.

7. A friction brake mechanism comprising a brake drum, a relatively fixed frame mounted on the drum, a plurality of brake shoes pivotally mounted at one of their ends upon the frame and on each side of the center of the frame, said shoes being in cooperative relation with the drum wall, resilient means intermediate the free ends of the shoes for normally raising the same from the periphery of the drum, said resilient means connecting the free ends of the brake shoes, a pivotal lever at the other end of each shoe for exerting sliding contact with the shoe for compressing the same against the drum, a rock shaft, and connecting means for initially transmitting the yielding rocking movement to the levers from said shaft and thereafter transmitting a further positive, non-yielding pressure through said levers onto the brake shoes to cause a concerted frictional action upon the drum wall and thereby lock the drum against rotation.

GEO. W. KUENNETH.